US 8,013,464 B2

(12) United States Patent
Stern et al.

(10) Patent No.: US 8,013,464 B2
(45) Date of Patent: Sep. 6, 2011

(54) POWER GENERATING SYSTEM INCLUDING MODULAR WIND TURBINE-GENERATOR ASSEMBLY

(75) Inventors: Mihail Stern, Toronto (CA); Alexander Trica, Toronto (CA); Tony Verrelli, Saint Catherines (CA); Budisan Nicolae, Timisoara (RO); Francisc Gyulai, Timisoara (RO)

(73) Assignee: Cleanfield Energy Corp., St. Catherines, Ontario (CA)

( * ) Notice: Subject to any disclaimer, the term of this patent is extended or adjusted under 35 U.S.C. 154(b) by 328 days.

(21) Appl. No.: 11/996,333

(22) PCT Filed: Jul. 28, 2006

(86) PCT No.: PCT/CA2006/001255
§ 371 (c)(1),
(2), (4) Date: Aug. 21, 2008

(87) PCT Pub. No.: WO2007/012195
PCT Pub. Date: Feb. 1, 2007

(65) Prior Publication Data
US 2008/0309090 A1 Dec. 18, 2008

Related U.S. Application Data

(60) Provisional application No. 60/703,013, filed on Jul. 28, 2005.

(51) Int. Cl.
*F03D 9/00* (2006.01)
(52) U.S. Cl. ............................................. 290/55; 290/44
(58) Field of Classification Search .................... 290/43, 290/44, 54, 55; 415/1, 3.1, 4.1, 4.2, 4.3, 415/4.5, 7, 906; 60/398; 416/1, 132 B
See application file for complete search history.

(56) References Cited

U.S. PATENT DOCUMENTS

| | | | | | |
|---|---|---|---|---|---|
| 4,299,537 | A | * | 11/1981 | Evans | 416/119 |
| 4,321,005 | A | | 3/1982 | Black | |
| 4,415,312 | A | * | 11/1983 | Brenneman | 416/119 |
| 4,430,044 | A | * | 2/1984 | Liljegren | 416/119 |
| 4,979,871 | A | * | 12/1990 | Reiner | 415/4.2 |
| 5,183,386 | A | * | 2/1993 | Feldman et al. | 416/119 |
| 5,252,029 | A | | 10/1993 | Barnes | |
| 5,997,252 | A | * | 12/1999 | Miller | 416/197 A |
| 6,394,745 | B1 | | 5/2002 | Quraeshi et al. | |
| 6,629,815 | B2 | * | 10/2003 | Lusk | 415/4.2 |
| 6,784,566 | B2 | | 8/2004 | Thomas | |
| 6,890,152 | B1 | * | 5/2005 | Thisted | 416/1 |
| 7,246,991 | B2 | * | 7/2007 | Bosche | 415/14 |

(Continued)

FOREIGN PATENT DOCUMENTS

| | | |
|---|---|---|
| DE | 297 05 410 | 11/1997 |
| EP | 0 957 265 | 11/1999 |
| EP | 1 398 500 | 3/2004 |
| FR | 2 541 383 | 8/1984 |
| GB | 2 033 019 | 5/1980 |

(Continued)

*Primary Examiner* — Tho D Ta
(74) *Attorney, Agent, or Firm* — Fish & Richardson P.C.

(57) ABSTRACT

A power generating system for generating electricity from the kinetic energy of a wind flow. The power generating system includes a turbine assembly, and a generator assembly, and may be also provided with a main brake assembly, as well as an emergency brake assembly. The system includes a series of modular components which can be built and adjusted in a modular manner so as to alter the configuration of the system, and thus maximize a generation of electricity by the system, depending on the particular conditions of the wind flow. Other improvements reside in the mounting spokes and aerodynamic blades of the system, as well as in its main brake assembly.

14 Claims, 10 Drawing Sheets

U.S. PATENT DOCUMENTS

| | | |
|---|---|---|
| 2003/0059306 A1 | 3/2003 | Miller |
| 2003/0155467 A1 | 8/2003 | Petrenko |
| 2004/0071541 A1 | 4/2004 | Rainbow |
| 2004/0086373 A1* | 5/2004 | Page, Jr. .................. 415/4.2 |
| 2004/0184909 A1 | 9/2004 | Miller |
| 2005/0099013 A1* | 5/2005 | Noguchi ................... 290/55 |
| 2006/0210389 A1* | 9/2006 | St-Germain et al. ........ 415/4.2 |
| 2007/0224029 A1* | 9/2007 | Yokoi ....................... 415/4.2 |

FOREIGN PATENT DOCUMENTS

| | | | |
|---|---|---|---|
| GB | 2 269 859 | | 2/1994 |
| GB | 2 331 556 | | 5/1999 |
| GB | 2 404 700 | | 2/2005 |
| WO | WO 9509304 | * | 4/1995 |
| WO | 03/027498 | | 4/2003 |
| WO | 03/040554 | | 5/2003 |

* cited by examiner

POWER GENERATING SYSTEM INCLUDING MODULAR WIND TURBINE-GENERATOR ASSEMBLY

CROSS REFERENCE TO RELATED APPLICATIONS

This application is the U.S. national phase of PCT/CA2006/001255 filed Jul. 28, 2006, and claims the benefit of U.S. Provisional Patent Application No. 60/703,013 filed on Jul. 28, 2005, both of which are incorporated by reference herein. The PCT application published in English as WO2007/012195 A1.

FIELD OF THE INVENTION

The present invention relates to a power generating system. More particularly, the present invention, in its preferred intended use, relates to a power generating system including a modular wind turbine-generator assembly that can be used for electricity production, whether grid connected or autonomous, for urban or remote locations, for example. The present invention also relates to a kit for assembling the power generating system, as well as to the method of operating associated thereto.

BACKGROUND OF THE INVENTION

Power generating systems, wind turbine-generator assemblies, and the like, are well known in the art, examples of which are described in the following patent applications: US 2003/0059306 A1; US 2004/0071541 A1; US 2004/0184909 A1; DE 297 05410 U1; EP 0,957,265 A2; EP 1,398,500A2; FR 2,541,383; GB 2,033,019 A; GB 2,331,556 A; GB 2,269, 859 A; GB 2,404,700 A; WO 03/027498 A1; and WO 03/040554 A1.

It is also known in the art that the braking torque of most existing electromagnetic brakes used with the above-mentioned types of devices is generated by an axial movement of a disk against a second one, typically being permanently attached to the rotating device. Generally, several springs will be used to generate the necessary braking force between the surfaces of both disks. Typically also, when energizing an electromagnet, springs will be compressed and the brake will be released. During normal operation of the rotating device, the electromagnet, being energized, will thus consume unnecessary energy. This energy will increase if the necessary braking force is higher. Furthermore, the resilient friction between the two braking disks also decreases the overall efficiency of the system, which is undesirable, for obvious reasons.

It is also well known in the art that every existing small wind system works more efficiently in a very narrow range of the average wind speed. Every such system has a specific installed power and for increased efficiency, special control methods, power electronics and various generator types are used, adding cost and complexity, and consequently reducing system reliability. In some cases, the added cost could increase the total cost of the system by more than 50%. In other cases, the size of the generator can be as much as double the needed one, having forced cooling for low speed operation. Even with special control methods (field oriented, state estimators, etc.), it would be very difficult to control or provide the necessary generator reactive power needed for variable speed operation.

Therefore, in view of the above, there is a need for a simpler, more reliable, easier to use, easier to maintain, safer, and/or more cost effective power generating system and/or method for generating electric power than what is possible with the aforementioned prior art.

SUMMARY OF THE INVENTION

The object of the present invention is to provide a power generating system which, by virtue of its design and components, satisfies some of the above-mentioned needs and is thus an improvement over other related systems and/or methods known in the prior art.

In accordance with the present invention, the above object is achieved, as will be easily understood, with a power generating system such as the one briefly described herein and such as the one exemplified in the accompanying drawings. The power generating system is preferably one including a modular wind turbine-generator assembly.

Namely, according to the present invention, there is provided a power generating system for generating electricity from kinetic energy of a wind flow, the power generating system comprising:
a turbine assembly comprising:
an operative shaft having a longitudinal axis, the operative shaft being rotatable about its longitudinal axis;
at least one mounting spoke projecting from the operative shaft, in a substantially perpendicular manner with respect to the longitudinal axis of said operative shaft, each mounting spoke being rotatable with the operative shaft and having an outer extremity defining an effective diameter about said operative shaft when rotated therewith;
at least one aerodynamic blade operatively mounted onto an outer extremity of a corresponding mounting spoke and extending in a substantially parallel manner with respect to the longitudinal axis of the operative shaft, each aerodynamic blade having a particular profile being oriented, shaped and sized to be exposed to the wind flow in order to receive the kinetic energy thereof and convert it into a rotation of the operative shaft by means of the at least one mounting spoke connected thereto; and
a generator assembly comprising:
a base shaft having a longitudinal axis and being operatively connected to the operative shaft of the turbine assembly;
a stator operatively mounted about the base shaft;
a rotor being relatively rotatable with respect to the stator, operatively via a rotation of the operative shaft, for generating electricity as a result of the rotor cooperating with the stator.

Preferably, the system comprises a main brake assembly operatively connected between the turbine assembly and the generator assembly for braking a rotation of the operative shaft.

Preferably also, components of the system are modular, and physical and geometrical configurations of the components are selected according to particular conditions of the wind flow for operating the system in a nominal working range so to maximize generation of electricity from the system.

Preferably also, the components are selected from the group consisting of turbine assembly, operative shaft, mounting spokes, aerodynamic blades, generator assembly, base shaft, stator, rotor and main brake assembly.

Preferably also, the physical and geometrical configurations are selected from the group consisting of average wind speed, turbine effective diameter, maximum nominal rotational speed, tip-speed ratio, turbine height, number of blades, blade aerodynamic airfoil, cord length, solidity, permanent magnet generator and annual energy production.

Preferably also, different lengths of mounting spokes are used for defining different effective diameters of the system depending on particular conditions of the wind flow for operating the system in a nominal working range.

Preferably also, each mounting spoke has a V-shaped profile for improving a starting torque of the system.

Preferably also, each aerodynamic blade is provided with corresponding end plates for improving an aspect ratio effect of said each aerodynamic blade.

Preferably also, each aerodynamic blade is a symmetrical NACA four-digit-series aerodynamic airfoil with modified tailing edge.

Preferably also, the system comprises a micro-vibration generating device for generating micro-vibrations to be transmitted to each aerodynamic blade of the system for deicing purposes.

Preferably also, each aerodynamic blade is provided with an adjustable tilting device for adjustably tilting said each aerodynamic blade with respect to a corresponding mounting spoke so as to vary the drag of each aerodynamic blade for carrying out an aerodynamic braking of the turbine assembly.

Preferably also, said at least one aerodynamic blade comprises three aerodynamic blades and said at least one mounting spoke comprises a pair of mounting spokes for each one of said three aerodynamic blades.

Preferably also, each aerodynamic blade comprises a stainless steel metallic structure.

Preferably also, the turbine assembly is a Darrieus-H wind turbine assembly.

Preferably also, the main brake assembly is an electromechanical brake assembly.

Preferably also, the main brake assembly is lodged within the generator assembly.

Preferably also, the system further comprises an emergency brake assembly operatively connected between the turbine assembly and generator assembly for braking a rotation of the operative shaft, in the event of a failure of the main brake assembly.

Preferably also, the base shaft of the generator assembly is made integral to the operative shaft of the turbine assembly so as to form a single main shaft being rotatable, and the generator assembly comprises a fixed casing mounted about the single main shaft via corresponding bearings so as to allow a rotation of the single main shaft with respect to the fixed casing, the fixed casing being shaped and sized for encasing the stator and the rotor, and an inner peripheral wall of the fixed casing being provided with the stator, and the rotor being mounted about the single main shaft so as to be rotatable therewith and within the stator of the fixed casing.

Alternatively, and preferably also, the base shaft of the generator assembly is fixed and separate from the operative shaft of the turbine assembly, and the generator assembly comprises a casing operatively connected to the operative shaft of the turbine assembly so as to be rotatable therewith, the rotatable casing being shaped and sized for encasing the stator and the rotor, the stator being mounted about the fixed base shaft of the generator assembly, and an inner peripheral wall of the rotatable casing being provided with the rotor so as to be rotatable with respect to the stator.

Preferably also, the rotor comprises a plurality of magnet poles provided on an internal wall of a casing of the generator assembly.

Preferably also, the stator comprises windings with tilted slots so as to reduce a cogging torque of the generator assembly.

Preferably also, the generator assembly comprises induction means or at least one permanent magnet.

Preferably also, the stator is internal and the rotor is external.

Preferably also, the system is grid connected or autonomous.

According to another aspect of the invention, there is also provided a facility provided with a plurality of the above-mentioned power generating systems.

According to yet another aspect of the invention, there is also provided a kit for assembling the above-mentioned power generating system.

According to yet another aspect of the invention, there is also provided a method for operating the above-mentioned power generating system.

According to yet another aspect of the present invention, there is also provided electric power generated with the above-mentioned power generating system and/or facility.

The objects, advantages and other features of the present invention will become more apparent upon reading of the following non-restrictive description of preferred embodiments thereof, given for the purpose of exemplification only, with reference to the accompanying drawings.

DETAILED DESCRIPTION OF PREFERRED EMBODIMENTS OF THE INVENTION

In the following description, the same numerical references refer to similar elements. The embodiments, dimensions, physical properties and/or geometrical configurations shown in the figures and described herein are preferred variants and are used for exemplification purposes only.

In the context of the present description, the expression "power generating system" or "assembly" includes all types of turbine-generator assemblies and the like. Although the present invention was primarily designed for use with wind, it could be used with other kinds of driving forces and/or fluids, such as water for example, or with any other suitable items, as apparent to a person skilled in the art. For this reason, the expression "wind", "wind flow" or any other related derivative form thereof, should not be taken as to limit the scope of the present invention and includes all other kinds of assemblies or items with which the present invention may be used and could be useful.

Moreover, in the context of the present description, the expressions "system", "assembly" and "device", "electricity" and "power", "power" and "energy", "wind" and "fluid", "spoke" and "arm", as well as any other equivalent expressions and/or compound words thereof, may be used interchangeably. The same applies for any other mutually equivalent expressions mentioned herein, as apparent to a person skilled in the art.

In addition, although the preferred embodiment of the present invention as illustrated in the accompanying drawings comprises various components such as the ones listed below, etc., and although the preferred embodiments of the power generating system and corresponding parts of the present invention as shown consist of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable geometrical configurations may be used for the power generating system according to the present invention, as will be briefly explained herein and as can be easily inferred herefrom, without departing from the scope of the invention.

Broadly described, the power generating system according to the present invention, as exemplified in the accompanying drawings, is one that preferably includes a modular wind turbine-generator assembly that can be used for electricity production, grid connected or autonomous, for urban or remote locations, for example.

According to the present invention, a family of wind systems can be built in a modular manner that can be used in various average wind speed locations and by selecting the appropriate modules which enable to generate the maximum estimated electrical energy production.

The proposed invention eliminates several of the disadvantages associated with the prior art, as previously discussed. Indeed, the modular approach according to the present invention offers the advantage of selecting the appropriate parts, bringing the turbine-generator system in the nominal working range according to the wind speed conditions of the system placement.

Preferably, the wind turbine uses an aerodynamic profile of the blades that are connected to the main shaft by using special profiled "spokes", better illustrated in FIGS. 1-4, and more particularly in FIGS. 11-14. As can be easily understood by a person skilled in the art based on the following explanation and accompanying drawings, different length of the spokes varies the diameter of the turbine and implicitly allows the turbine-generator to function in a most efficient working area.

Figure 3:
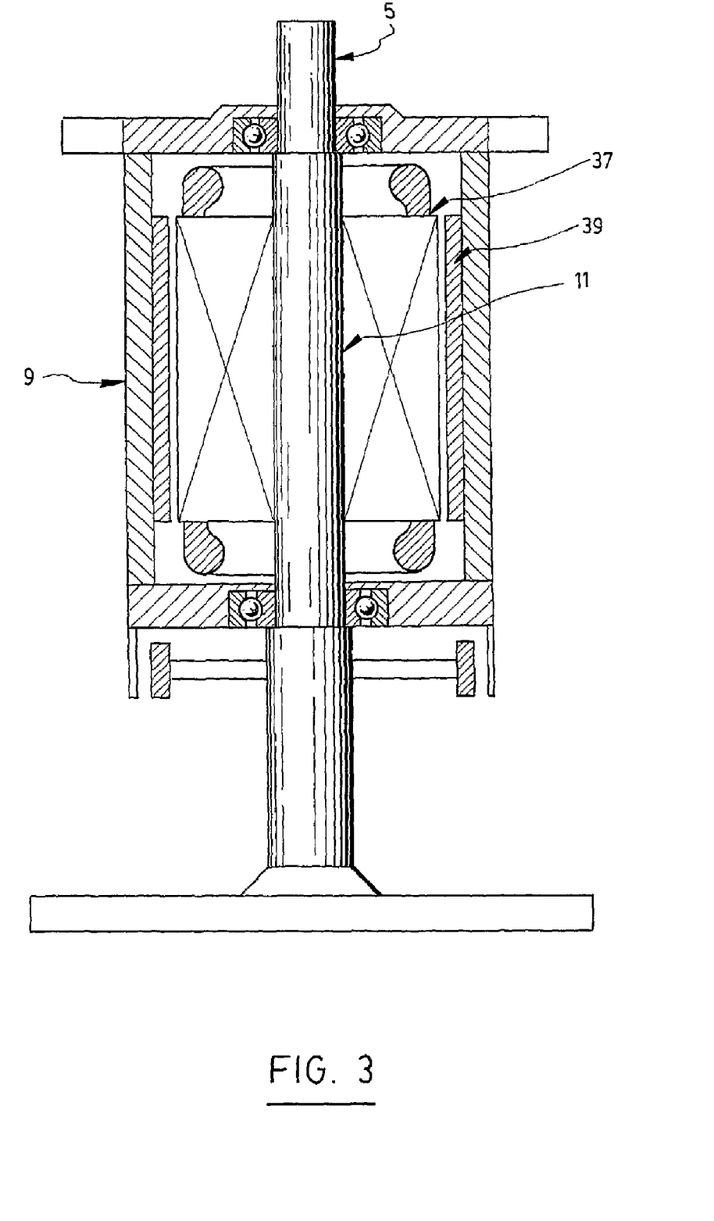
FIG. 3 is a cross-sectional schematic view of a permanent magnet (P.M.) generator of the power generating system according to a preferred embodiment of the present invention.
Figure 4:
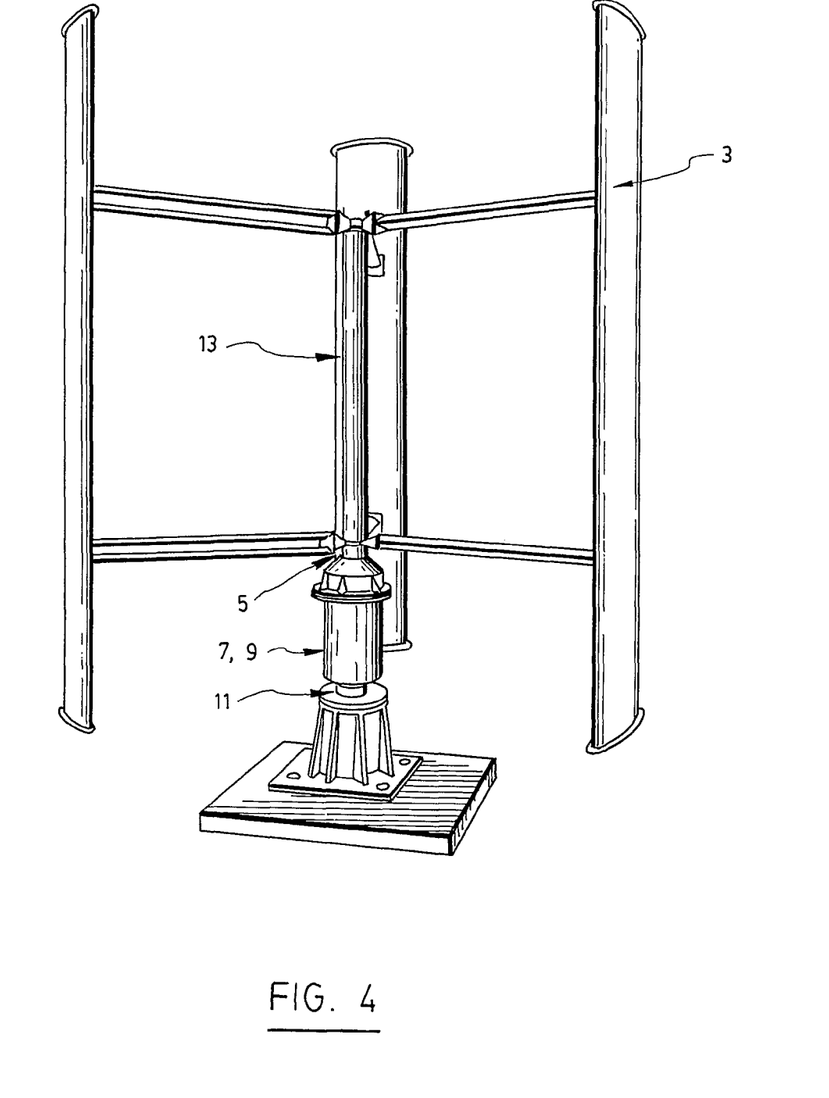
FIG. 4 is a perspective view of a power generating system including a modular wind turbine-generator assembly according to another preferred embodiment of the present invention.
Figure 5:
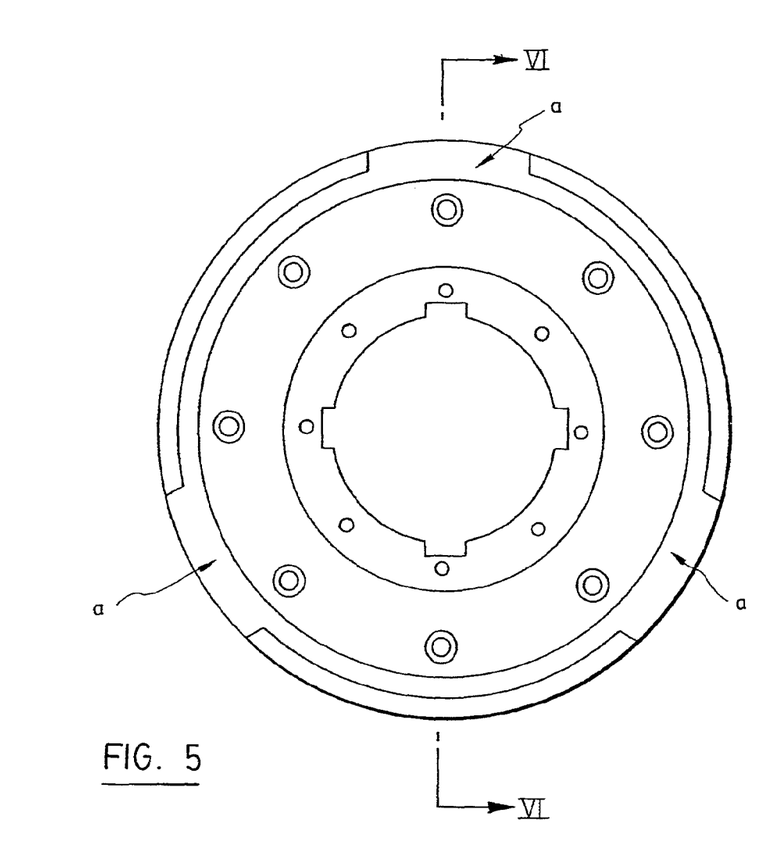
FIG. 5 is a front view of a brake assembly according to a preferred embodiment of the present invention.
Figure 6:
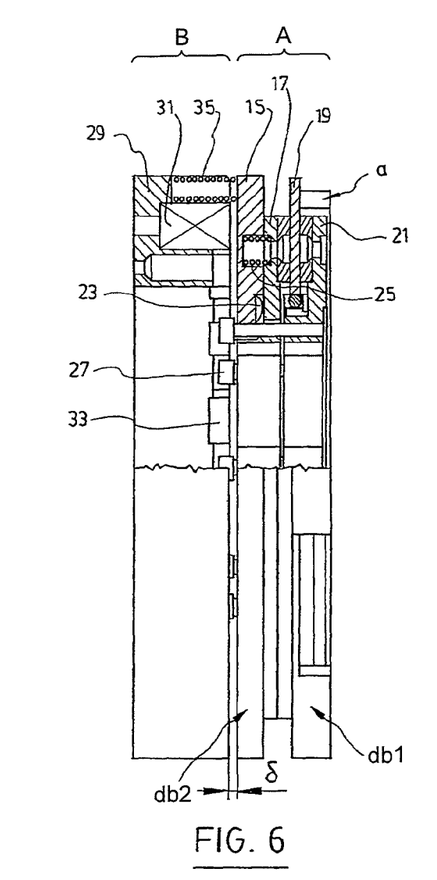
FIG. 6 is a side elevational view of what is shown in FIG. 5.

Preferably also, the generator (whether induction or permanent magnet 39) is directly connected to the turbine shaft and has a non-standard construction. With an internal stator and external rotor, the generator has non-moving electrical contacts, providing also easy installation of permanent magnets 39 (in the case of permanent magnet generators, for example) and a revolutionary construction for the external "squirrel cage" in case of the induction generator. In both cases, the internal stator of the generator is identical and only the external rotor would be different based on the type of chosen generator.

The above preferred generator construction offers the possibility of optimizing the overall cost of the system by selecting different power electronics and control methods.

For example, low cost systems can be used for heating or pumping applications (having permanent magnets generators), as for more advanced applications (grid connected or autonomous grid generators), both types of generators can be used.

Two more innovative elements may be preferably added to the turbine-generator assembly, namely, a clutch which is preferably mechanically connected between turbine and generator; and a controlled electro-mechanical brake which is preferably assembled inside the generator. However, it is to be noted that the clutch, although advantageous, is not absolutely essential for proper operating of the power generating system according to the present invention, as briefly explained herein, and as will be better understood by a person skilled in the art from the following description.

Figure 1:
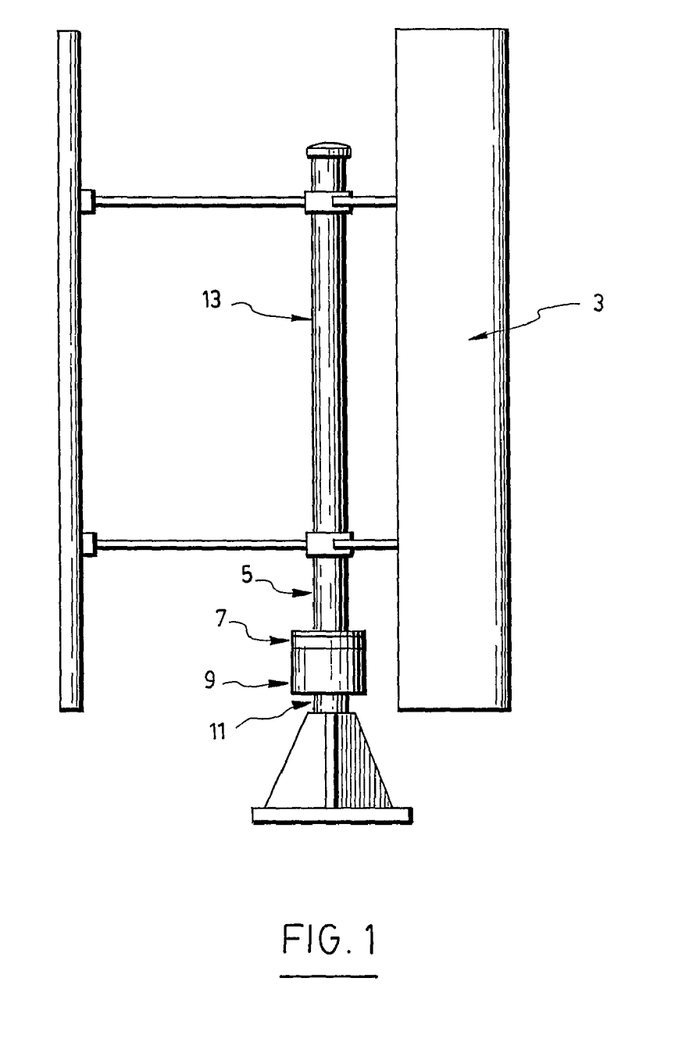
FIG. 1 is an elevational view of the power generating system including a modular wind turbine-generator assembly according to a preferred embodiment of the present invention.
Figure 2:
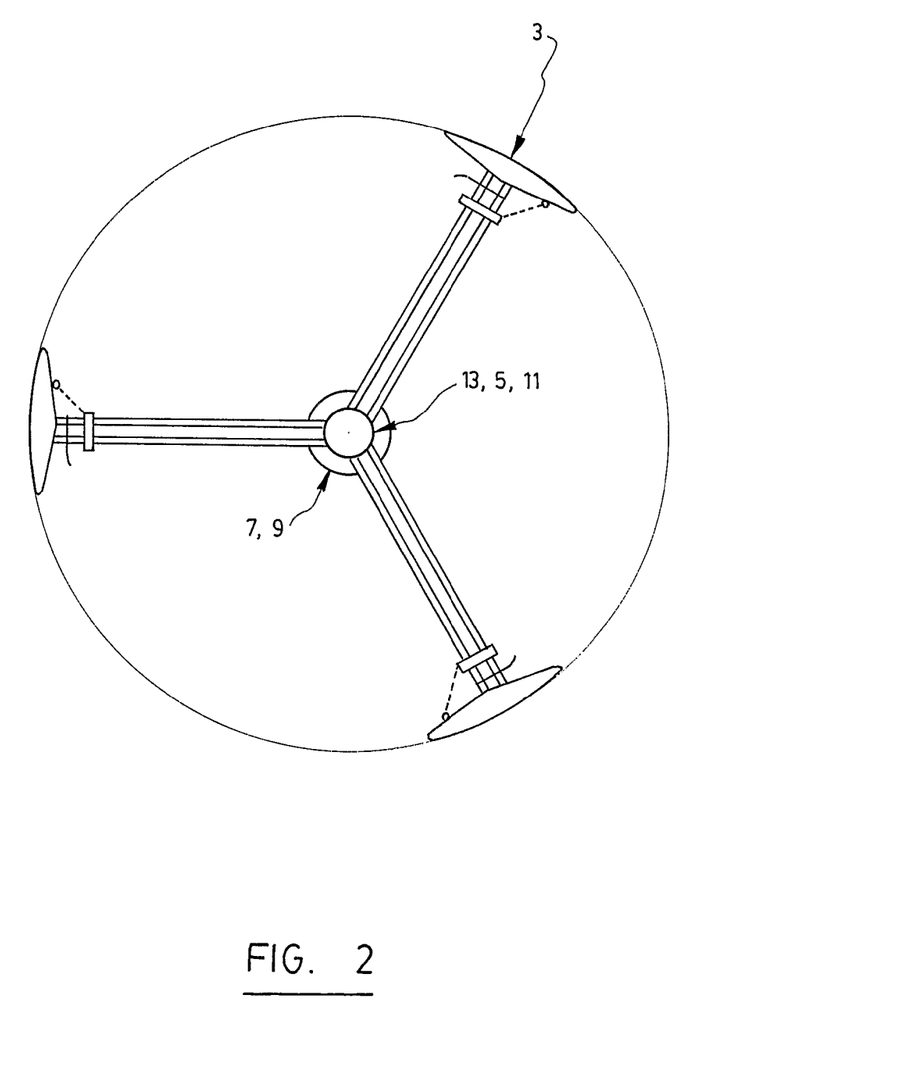
FIG. 2 is a top plan view of what is shown in FIG. 1.

System Description:

Indeed, as better shown in FIGS. 1 and 2, the proposed and preferred wind turbine-generator architecture is a vertical axis type with original elements. It preferably employs a "Darrieus-H" wind turbine 3 to convert the wind energy in mechanical energy to be transferred via a direct shaft 5 and clutch connection 7 to the external generator rotor 9. The mechanical energy is converted to electrical energy via magnetic coupling to the internal generator stator 37, mechanically mounted to the generator shaft 11. The shaft supports the internal brake and is aligned with the main shaft of the wind turbine 13.

The design of the wind system (for moderate average wind speed areas, about 4-7 m/s) follows the "Wind Turbines, Part 2, Design requirements for small wind turbines, #61400—2/CDV/IEC (E) standard of the International Electrotechnical Commission". According to the standard, the proposed wind turbine is part of Class 4 (SWT Class IV) and has the best efficiency in the average wind speed range of about 4 m/s to 6 m/s.

Preferably, the turbine-generator system can be equipped with one of the three variances:
  average wind speed: 4; 5; 6 m/s;
  turbine diameter: 2.5; 2; 1.5 m;
  maximum nominal rotational speed: 250; 310; 410 RPM;
  tip-speed ratio: 2-3;
  turbine height: 3 m;
  number of blades: 3;
  blade aerodynamic airfoil: symmetrical NACA with four digits series with modified tailing edge to improve manufacturability;
  cord length: 0.4 m;
  solidity: 0.8; 0.6; 0.48;
  2.5 kW PM generator; and
  estimated annual energy production: 2000; 2600; 2900 [kWh/year].

Preferably also, special measures can be taken for improving the performance of the turbines:

end plates to each blade to improve the "aspect ratio" effects;

"V" shape profile spokes for improving the starting torque; micro-vibrations of the blades for "de-icing" effect; and stainless steel metallic structure embedded in the blades with double role: support structure and lightning protection (the turbine has also provision for mounting a lightning rod).

Preferably also, the three blades are mounted to the main turbine shaft with six spokes of different lengths according to each of the above-described turbine.

Preferably also, the automatic clutch, installed between the turbine and the generator, allows the turbine to rotate free at low wind speed and kicks in at a rotational speed that generates a torque higher than the generator cogging torque.

For easy mounting, the main shaft of the turbine-generator assembly is preferably composed of two pieces, turbine shaft and generator shaft that will be mounted together according to the installation procedure. The turbine rotor and the generator rotor are preferably mounted via suitable bearings to their corresponding shafts.

Preferably also, an emergency brake is installed inside the generator as a protection to over-speed, un-predicted mass unbalance, etc., as apparent to a person skilled in the art.

According to another preferred embodiment of the present invention and as better shown in FIG. 3, the first possible generator used in the system is a permanent magnet type with vertical axis. The exterior rotor increases the reliability of the system as the permanent magnet poles (rare earth magnets) are glued on the interior of the rotating cylinder which is part of the magnetic path of the generator. The centrifugal forces help keeping in place the magnets. The internal stator of the generator is directly connected to the fixed generator shaft and has a special construction. Tilted slots for the windings have an effect of reducing the generator cogging torque to values below about 3% of the nominal torque of the generator. This stator type will be used in case of the induction generator.

Preferably also, an integrated electro-mechanical brake is also part of the generator construction. This original brake is controlled via pulse current and has "mechanical memory". Whether closed or opened, the brake will not be consuming any energy during normal operation, as can be easily understood by a person skilled in the art.

In the following (Table 1) are the main parameters of the first possible embodiments of permanent magnet pole generators used:

TABLE 1

Parameters of Permanent Magnet Generators

| | Parameters | Generator 1 | Generator 2 |
|---|---|---|---|
| 1 | RPM | 250 rpm | 250 rpm |
| 2 | Air gap | 1 mm | 1.4 mm |
| 3 | Number of slots | 48 | 36 |
| 4 | Number of poles | 16 | 16 |
| 5 | Winding step | 1-4 | 1-3 |
| 6 | Number of turns | 40 | 44 |
| 7 | Wire size | 4×Φ0.9 mm | 3×Φ0.9 + 2×Φ0.95 |
| 8 | Number of layers | 1 | 2 |
| 9 | Connection | Series | Series |
| 10 | Slot filling ratio | 0.956 | 0.945 |
| 11 | Resistance/phase | 1.05 | 0.65 |
| 12 | Slot tilt | 0.58 step slot | 1 step slot |
| 13 | Tilt factor | 0.991 | 0.921 |
| 14 | Flux density | 0.796 T | 0.667 T |
| 15 | Electromotive force at 250 RPM | 170 V | 108 V |
| 16 | Electromotive force at 40 RPM | 27 V | 17 V |
| 17 | Nominal power | >4 kW | 2.5 kW |

Experimental results show improvement opportunities as: reduced air gap, slot tilt, phase resistance, machine length, and higher efficiency.

Modular Concept Description:

A main objective of the modular concept according to the present invention is to offer a low cost configurable wind system that can be easy tailored to deliver the maximum efficiency based on average wind speed and vertical height of the turbine placement.

The main system preferably comprises the following modules, comprising the following preferred features:

a) turbine blades, preferably three of them—made of fibre-glass-reinforced polyester and manufactured such that the surface roughness will confer the best aerodynamic smoothness. The end plates improve the aspect ratio effects of the blades. Blades mounting in the turbine assembly as well as lightning protection are made based on the stainless steel blade inserts;

b) a turbine and generator support structure—comprising:

i) a turbine and generator shaft made of two pieces, one, part of the turbine assembly and the second one, part of the generator assembly—the two pieces are rigid mounted together as shaft assembly during the final assembly process; and ii) a turbine and generator rotor made of two pieces, one, part of the turbine assembly and the second one, part of the generator assembly—the two parts are mounted together as rotor assembly during the final assembly process—in addition, during the final assembly process the shaft and the rotor are mounted together via two special bearings;

c) a clutch assembly—connects together the turbine and the generator rotors. Its role is to provide a better starting torque of the generator;

d) an electrical brake—mounted in the lower side of the generator shaft—its role is for over speed protection and can also be used for turbine speed control;

e) an electric generator—built also as a modular concept and having the stator design such that it can accommodate both induction and permanent magnet rotor types;

f) spokes, preferably six of them—connect the blades with the turbine rotor assembly—the "V" shape of the spokes creates an aerodynamic asymmetry, which has a positive contribution to turbine starting torque—various spokes lengths will contribute to various turbine swept area; and g) an optional braking module can be used as a connection between blade and spokes. Its role is to modify the mounting angle of the blades and create an aerodynamic brake of the turbine.

The following (Table 2) is an example of three different turbine parameters that can be used in three different average wind speed locations. The only modification is the length of the spokes. The rest of the modules are the same. Installed power: about 2500 W.

TABLE 2

Turbine parameters

| System # | 1 | 2 | 3 |
|---|---|---|---|
| Turbine diameter [m] | 2.5 | 2 | 1.5 |
| Swept area [m2] | 7.5 | 6 | 4.5 |
| Max. turbine speed [rpm] | 250 | 310 | 410 |
| Max. peripheral speed [m/s] | 32.5 | 32.5 | 32.5 |
| Average wind speed [m/s] | 4 | 5 | 6 |
| Estimated annual energy production [kWh/year] | 1750-2000 | 2400-2675 | 2750-2930 |

Any other combinations are possible as long as the peripheral turbine speed is less than about 32.5 m/s, as can be easily understood by a person skilled in the art.

Brake Assembly with Preferred Magnet Brake with Control Electromagnet and Pre-Compressed Disk Brakes:

The brake assembly according to the present invention, also referred to herein as "permanent magnet brake", eliminates the previously-discussed prior art disadvantages, in that a mobile disk pad will be pressed against the rotating device only during the brake action and this will thus eliminate the resilient friction. Preferably also, helicoidally springs compress two braking pads (DB1, DB2) together with a mobile disk brake. Preferably also, as long as the permanent magnet is not magnetized, the brake will be "on" all the time. By applying a current pulse to the control electromagnet, the permanent magnet will become magnetized and the brake will become "off". Preferably also, the permanent magnet will maintain the brake "off" configuration as long as it is needed. In order to turn the brake "on", a second current pulse to the control electromagnet can be carried out and will de-magnetize the permanent magnet and thus, the disk brake pads will be compressed again. The energy consumption during such a braking action will be close to zero as the only needed energy is to generate the current pulses for magnetizing and de-magnetizing the permanent magnet.

The brake assembly preferably comprises a brake subassembly "A" and an electro-magnet subassembly "B". The brake subassembly "A" preferably comprises the following components: a fero-magnetic armature 15; a friction disk DB1 (e.g. metal support and disk pad) 17; a mobile friction disk 19 with slots "a" for coupling with the rotating device; a friction disk DB2 (e.g. support and disk pad) 21; a spring washer 23; helicoidally springs 25 for generating the compressing force; and corresponding screws 27.

Figure 7:
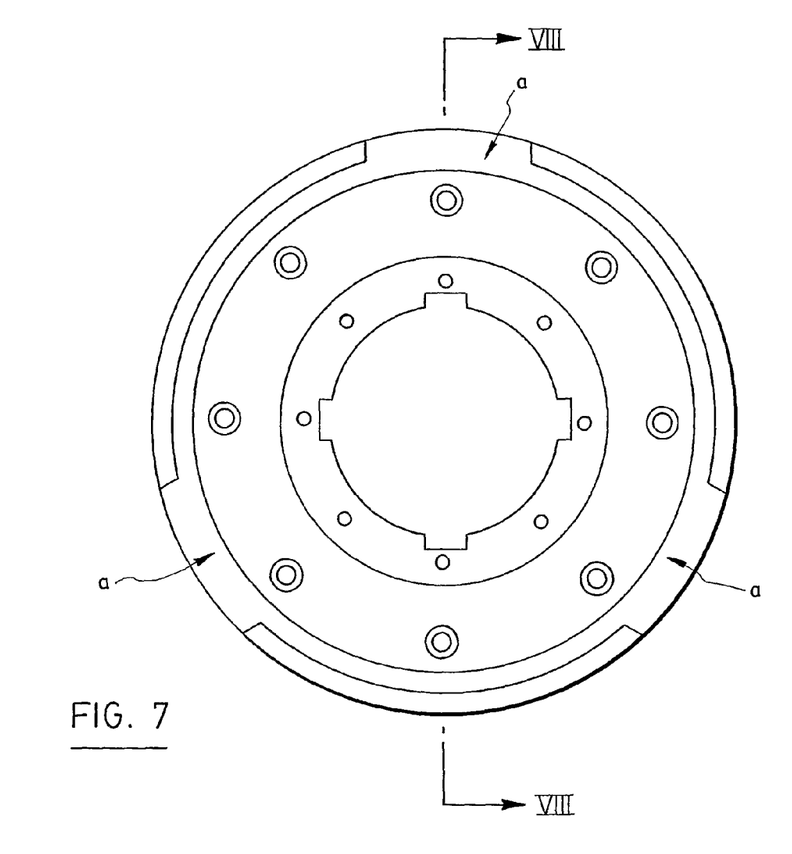
FIG. 7 is a front view of an electro-magnet subassembly of the brake assembly shown in FIGS. 5 and 6.
Figure 8:
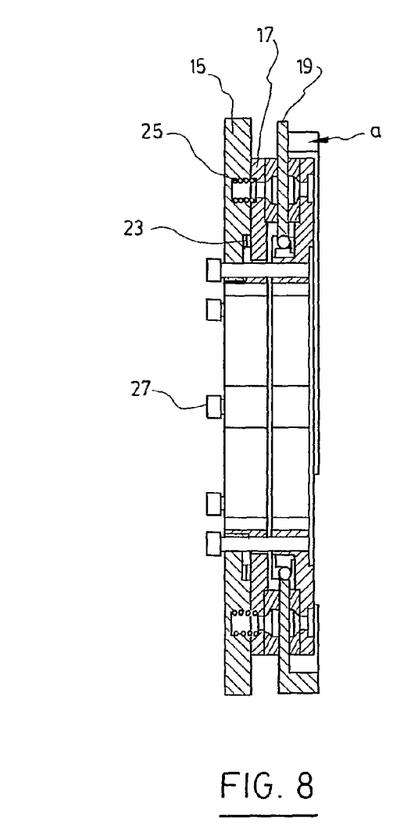
FIG. 8 is a side elevational view of what is shown in FIG. 7.
Figure 9:
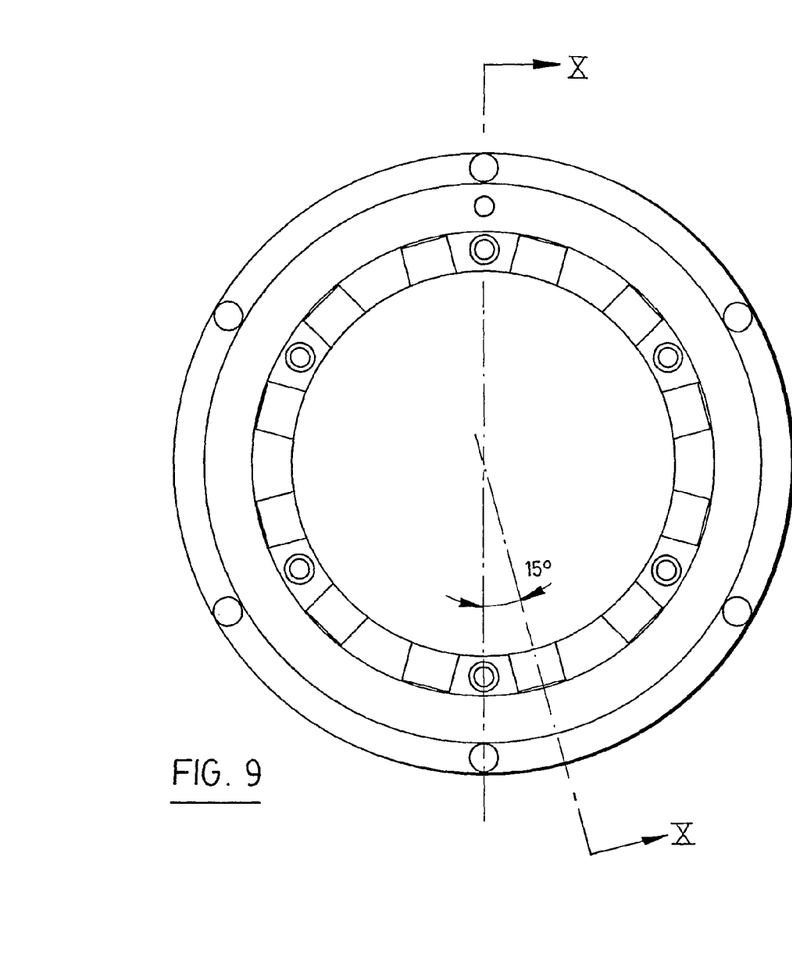
FIG. 9 is a front view of a brake mechanism' subassembly of the brake assembly shown in FIGS. 5 and 6.
Figure 10:
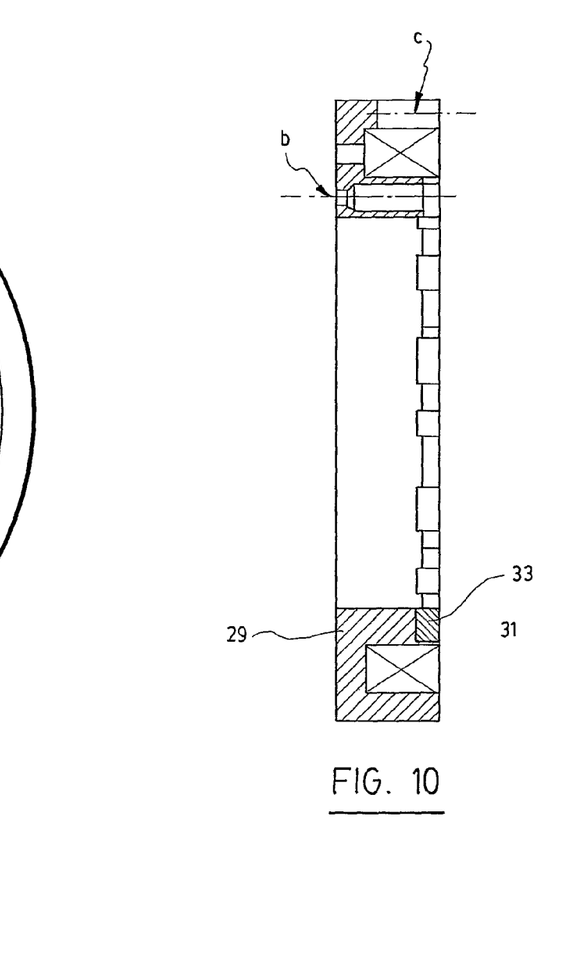
FIG. 10 is a side elevational view of what is shown in FIG. 9.

The electro-magnet subassembly "B" preferably comprises the following components: a metal enclosure 29; an electro-magnet coil 31; permanent magnets 33; slots "b" for connection with the rotating device; and slots "c" for helicoidally springs 35.

Examples of advantages resulting from the above-described "permanent magnet brake" are the following: low brake energy consumption; low power electro-magnet subassembly (e.g. lower electro-magnetic force needed); and elimination or substantial reduction of the resilient friction.

Preferably, the permanent magnet brake (with pre-compressed disk brakes) uses fixed disks brake DB1, DB2 17, a mobile disk brake 19 and disk pads 21 pre-compressed by a spring washer 23 and helicoidally springs 25, where the pressing force adjustment is realized with corresponding screws 27 and where the brake action is realized by axial displacement of the brake sub-assembly "A" and the mechanical coupling of the mobile disk friction 19 with the rotating device to be braked.

Preferably also, the force to sustain the brake in the released state is realized by the electro-magnetic sub-assembly "B" by using permanent magnets, magnetized by a current pulse applied to the electro-magnet's coil 31.

Preferably also, the force to sustain the brake in the engaged state is realized by the pre-compressed brake disks and by the electro-magnetic sub-assembly "B" by using permanent magnets, de-magnetized by a current pulse applied to the electro-magnet's coil 31.

Preferably also, the permanent magnet brake (with pre-compressed disk brakes) acts as an electro-mechanical flip-flop where the change of state from brake engaged to brake released and vice-versa is realized by the control electro-magnet device to de-magnetize and magnetize a permanent magnet.

Preferably also, the permanent magnet brake (with pre-compressed disk brakes) uses minimal power consumption for high efficiency power generating systems, including wind power generation.

Support Arms for Vertical Axis Wind Turbine:

The role of conventional "mounting spokes", referred to herein also as "support arms", is to connect the blades to the vertical shaft of the wind turbine. The shape, weight and size of the arms are important parameters and usually have a negative effect to the overall performance of the turbine. They generally introduce aerodynamic losses and reduce the efficiency of the system.

It is known that an H-Darrieus type wind turbine with vertical blades is a lift-base turbine with a tip speed ratio greater than unity (the rotational speed of the blades is higher than the wind speed). It is also known that this turbine type will generally not start by itself due to possible theoretical negative starting torque (depending on blade position toward the wind, friction losses in bearings and cogging torque of the generator). Furthermore, support arms will generally introduce a drag component that will create additional resistive force and lower the efficiency of the turbine.

The mounting spokes or "supporting arms" according to the present invention eliminate the above disadvantages, in that each support arm is preferably provided with two main parts: a) an aerodynamic profile, preferably close to the blades; and b) a "V" section profile, preferably close to the vertical shaft.

Figure 11:
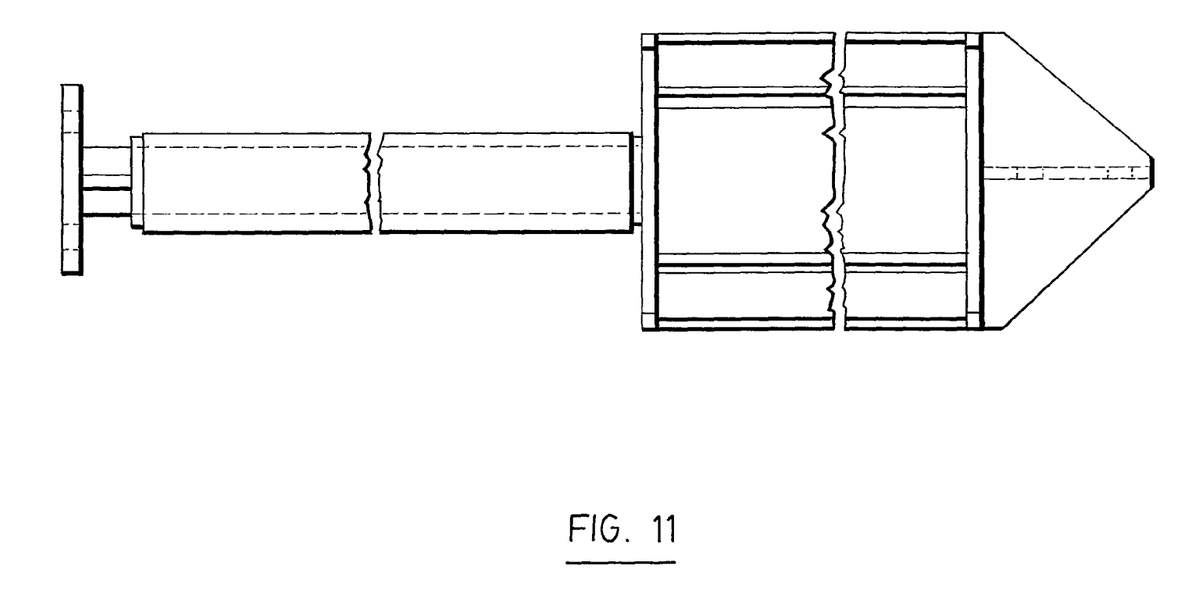
FIG. 11 is a front plan view of a mounting spoke according to a preferred embodiment of the present invention.
Figure 12:
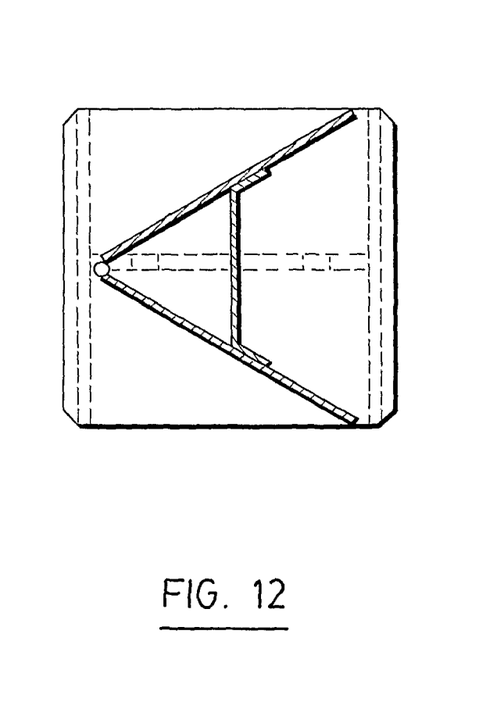
FIG. 12 is a cross-sectional view taken along line A-A of FIG. 11.
Figure 13:
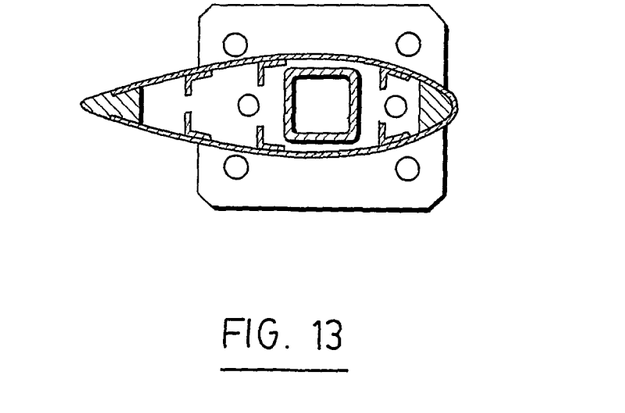
FIG. 13 is a cross-sectional view taken along line B-B of FIG. 11.
Figure 14:
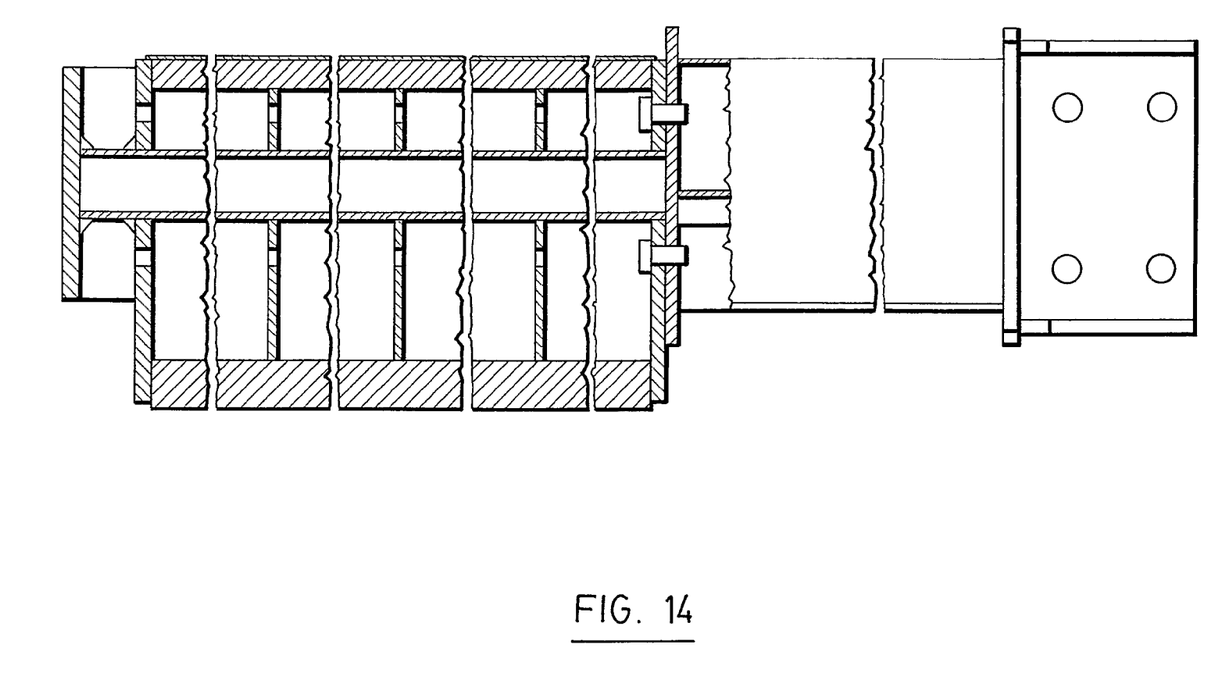
FIG. 14 is a cross-sectional view taken along line C-C of FIG. 11.

The optimal length of "V" section part depends on the calculated tip speed ratio of the turbine. It is known that a V-section is a drag-base profile and cannot have a rotational speed higher than the wind speed. The length of this part according to the present invention is preferably calculated so that its tip speed is less or equal to unity in the nominal wind speed range of the turbine.

Examples of advantages of such a support arm or mounting spoke according to the present invention are the following: the aerodynamic profile part will lower the overall system losses; due to existing turbulences on the roof top of a building, this part can also increase the starting torque of the turbine; and the "V" section part will have the main role in generating positive starting torque of the turbine (above the high limit of the nominal speed range of the turbine, this part will have an effective role in generating resistive torque hence protecting the turbine at high wind speed).

The mounting spoke or "support arm" according to the preferred embodiment of the present invention is a support arm for a H-Darrieus vertical axis wind turbine comprising a "V" shape section part (preferably close to the vertical turbine shaft) for generating the starting torque of the turbine and an aerodynamic part (preferably close to the blade) to reduce the resistive torque during normal operation.

The turbine-generator assembly and corresponding parts are preferably made of substantially rigid materials, such as metallic materials (steel, etc.), hardened polymers, composite materials, and/or the like, so as to ensure a proper operation thereof depending on the particular applications for which the assembly is intended and the different parameters in cause (wind force, etc.), as apparent to a person skilled in the art.

As may now be better appreciated, the present invention is a substantial improvement over the prior art, in that, the modular turbine-generator assembly may be used for a family of low vertical axis wind systems, and is adaptable for different average wind speeds of a particular location, the system being designed to be used in a median average wind speeds with a desired output power, the unified solution being comprised of integrated turbine-generator-brake-clutch and using "V" profile spokes for self-starting operation.

The present invention is also particularly advantageous in that it consists of a modular turbine-generator assembly where the turbine is connected to the main shaft by using variable length spokes in order to adjust to the average wind speed of a selected location.

The present invention is also particularly advantageous in that: the turbine is connected to the generator via an automatic centrifugal clutch; the vertical axis generator has a special construction with interior stator and exterior rotor; the turbine has innovative elements as end plates to improve the "aspect ratio" effects of the blades and non-symmetrical aero-dynamic profile (V profile) of the mounting spokes for increased starting torque of the turbine; it has a special construction of the generator stator (tilted slots) for reducing the cogging torque of the generator; it has a unique stator design to be used in a permanent magnet generator or induction generator; and it is characterized by an adjustable centrifugal clutch to exceed the resistant starting torque of the generator.

The present invention is also an improvement and presents several advantages over devices known in the prior art, in that, as may now be better appreciated from the above description, it is also a more reliable, easier to use, easier to maintain, safer, more efficient and more cost effective turbine-generator assembly than those available in the prior art.

Of course, numerous modifications could be made to the above-described embodiments without departing from the scope of the invention, as defined in the appended claims.

The invention claimed is:

1. A power generating system for generating electricity from kinetic energy of a wind flow, the power generating system comprising:
   a turbine assembly comprising:
      an operative shaft having a longitudinal axis, the operative shaft being rotatable about its longitudinal axis;
      at least one mounting spoke projecting from the operative shaft, in a substantially perpendicular manner with respect to the longitudinal axis of said operative shaft, each mounting spoke being rotatable with the operative shaft and having an outer extremity defining an effective diameter about said operative shaft when rotated therewith;
      at least one aerodynamic blade operatively mounted onto an outer extremity of a corresponding mounting spoke and extending in a substantially parallel manner with respect to the longitudinal axis of the operative shaft, each aerodynamic blade having a particular profile being oriented, shaped and sized to be exposed to the wind flow in order to receive the kinetic energy thereof and convert it into a rotation of the operative shaft by means of the at least one mounting spoke connected thereto; and
   a generator assembly comprising:
      a base shaft having a longitudinal axis and being operatively connected to the operative shaft of the turbine assembly;
      a stator operatively mounted about the base shaft; and
      a rotor being relatively rotatable with respect to the stator, operatively via a rotation of the operative shaft, for generating electricity as a result of the rotor cooperating with the stator;
   wherein physical and geometrical configurations of the components are selected according to particular conditions of the wind flow for operating the system in a nominal working range so to maximize generation of electricity from the system;
   wherein the stator of the generator assembly is internal to the rotor of the generator assembly, the rotor being external with respect to the stator;
   wherein the system comprises a main brake assembly operatively connected between the turbine assembly and the generator assembly for braking a rotation of the operative shaft, the main brake assembly being an electro-mechanical brake assembly, and being lodged within the generator assembly; and
   wherein the main brake assembly comprises a brake subassembly and an electro-magnet subassembly.

2. A system according to claim 1, wherein the physical and geometrical configurations are selected from the group consisting of average wind speed, turbine effective diameter, maximum nominal rotational speed, tip-speed ratio, turbine height, number of blades, blade aerodynamic airfoil, cord length, solidity, permanent magnet generator and annual energy production.

3. A system according to claim 1, wherein different lengths of mounting spokes are used for defining different effective diameters of the system depending on particular conditions of the wind flow for operating the system in a nominal working range.

4. A system according to claim 1, wherein each mounting spoke has a V-shaped profile for improving a starting torque of the system.

5. A system according to claim 1, wherein each aerodynamic blade is provided with corresponding end plates for improving an aspect ratio effect of said each aerodynamic blade.

6. A system according to claim 1, wherein each aerodynamic blade is a symmetrical NACA four-digit-series aerodynamic airfoil with modified tailing edge.

7. A system according to claim 1, wherein said at least one aerodynamic blade comprises three aerodynamic blades and wherein said at least one mounting spoke comprises a pair of mounting spokes for each one of said three aerodynamic blades.

8. A system according to claim 1, wherein each aerodynamic blade comprises a stainless steel metallic structure.

9. A system according to claim 1, wherein the turbine assembly is a Darrieus-H wind turbine assembly.

10. A system according to claim 1, wherein the base shaft of the generator assembly is made integral to the operative shaft of the turbine assembly so as to form a single main shaft being rotatable, and wherein the generator assembly comprises a fixed casing mounted about the single main shaft via corresponding bearings so as to allow a rotation of the single main shaft with respect to the fixed casing, the fixed casing being shaped and sized for encasing the stator and the rotor, and an inner peripheral wall of the fixed casing being provided with the stator, and the rotor being mounted about the single main shaft so as to be rotatable therewith and within the stator of the fixed casing.

11. A system according to claim 1, wherein the base shaft of the generator assembly is fixed and separate from the operative shaft of the turbine assembly, and wherein the generator assembly comprises a casing operatively connected to the operative shaft of the turbine assembly so as to be rotatable therewith, the rotatable casing being shaped and sized for encasing the stator and the rotor, the stator being mounted about the fixed base shaft of the generator assembly, and an inner peripheral wall of the rotatable casing being provided with the rotor so as to be rotatable with respect to the stator.

12. A power generating system for generating electricity from kinetic energy of a wind flow, the power generating system comprising:
   a turbine assembly comprising:
      an operative shaft having a longitudinal axis, the operative shaft being rotatable about its longitudinal axis;

at least one mounting spoke projecting from the operative shaft, in a substantially perpendicular manner with respect to the longitudinal axis of said operative shaft, each mounting spoke being rotatable with the operative shaft and having an outer extremity defining an effective diameter about said operative shaft when rotated therewith;

at least one aerodynamic blade operatively mounted onto an outer extremity of a corresponding mounting spoke and extending in a substantially parallel manner with respect to the longitudinal axis of the operative shaft, each aerodynamic blade having a particular profile being oriented, shaped and sized to be exposed to the wind flow in order to receive the kinetic energy thereof and convert it into a rotation of the operative shaft by means of the at least one mounting spoke connected thereto; and a generator assembly comprising:

a base shaft having a longitudinal axis and being operatively connected to the operative shaft of the turbine assembly;

a stator operatively mounted about the base shaft; and a rotor being relatively rotatable with respect to the stator, operatively via a rotation of the operative shaft, for generating electricity as a result of the rotor cooperating with the stator;

wherein the system is grid connected or autonomous;

wherein physical and geometrical configurations of the components are selected according to particular conditions of the wind flow for operating the system in a nominal working range so to maximize generation of electricity from the system;

wherein the stator of the generator assembly is internal to the rotor of the generator assembly, the rotor being external with respect to the stator;

wherein the system comprises a main brake assembly operatively connected between the turbine assembly and the generator assembly for braking a rotation of the operative shaft, the main brake assembly being an electro-mechanical brake assembly, and being lodged within the generator assembly; and wherein the main brake assembly comprises a brake subassembly and an electro-magnet subassembly.

13. A system according to claim 12, wherein the brake subassembly comprises a fero-magnetic armature, a friction disk, a mobile friction disk with slots for coupling with a rotating device, a friction disk, a spring washer and helicoidally springs for generating a compressing force.

14. A system according to claim 13, wherein the electro-magnet subassembly comprises a metal enclosure, an electro-magnet coil, permanent magnets, slots for connection with the rotating device and slots for helicoidally springs.

* * * * *